Patented Aug. 22, 1939

2,170,274

UNITED STATES PATENT OFFICE 2,170,274

BAKING POWDER

Willard L. Morgan, Calumet City, Ill., assignor to American Maize-Products Company, a corporation of Maine No Drawing. Application December 18, 1937, Serial No. 180,499

10 Claims. (Cl. 99—95)

My invention relates to baking powders and more particularly to new acid ingredients for liberating carbon dioxide from the bicarbonate ingredient of baking powders.

As is well known to those skilled in this art the leavening of bakery products is accomplished by liberation of carbon dioxide within the dough or batter during its preparation and in the early stages of baking. The carbon dioxide serves the purpose of lightening the baked product, giving it a finer, smoother texture and increasing its size. In the more recent forms of baking powder the liberation of carbon dioxide is effected by means of an acid salt which reacts with the usual bicarbonate constituent of the baking powder whereby the bicarbonate is decomposed and its carbon dioxide content is liberated. Examples of the acid salts contained in these baking powders are phosphates, tartrates and sulphates. It has also become a practice to use two sources of acidity in baking powders, one such as phosphates which reacts rapidly in the wet dough, and a slower reacting source of acidity such as alums, or calcium lactate which liberate carbon dioxide during the baking operations.

The United States Government has established a standard for baking powders with respect to the minimum amount of available carbon dioxide that they should yield. This minimum amount is 12%. This requirement establishes a minimum amount of bicarbonate that must be present in the baking powder to give at least this minimum yield of carbon dioxide. The amount of acid ingredient used for liberating the carbon dioxide from the bicarbonate is necessarily in proportion to the amount of bicarbonate used in the baking powder. That is, an increase in the amount of bicarbonate used would necessitate a corresponding increase in the amount of the acid ingredient used. Increase in amounts of these two materials would require a proportionate decrease in amount of the stabilizing ingredient, which is usually corn starch, in the baking powder.

When using baking powders heretofore proposed the reaction between the acid ingredient and bicarbonate begins almost immediately upon the addition of water, that is, at the time the dough is prepared, and therefore a relatively large amount of carbon dioxide is lost before the product is baked. Increasing the amount of sodium bicarbonate and acid ingredient will not reliably compensate for this loss, since the percentage loss of carbon dioxide during the doughing step may increase. Therefore an increase in both ingredients would not be warranted. The alum type of baking powders heretofore used have to some extent the desired property of reacting slowly during the doughing step with consequent reduction in loss of carbon dioxide during this step, but they possess the disadvantage of leaving as a residue in the bakery product, bitter sodium sulphate or Glauber's salt.

Heretofore, in order to provide the required minimum of 12% available carbon dioxide it has been necessary to use about 30% to 50% by weight of acid ingredient which necessarily limits the amount of starch or other stabilizing agent used to about 25% to 45%. If the stabilizing ingredient is increased materially beyond this maximum the baking powder will not produce the required 12% carbon dioxide and if the amount of stabilizing material is reduced below this minimum the baking powder will be unstable, i. e., it will react slowly during storage and thereby lose its leavening strength and tend to cake together.

An object of my invention is to provide a baking powder having an improved acid ingredient that will react slowly with the bicarbonate during the doughing step in the production of leavened bread but will efficiently liberate relatively large amounts of carbon dioxide during the baking step.

In contrast to the various baking powders heretofore used, the baking powder of my invention yields substantially greater amounts of carbon dioxide; reacts very slowly during the doughing step in the manufacture of bread thereby conserving the carbon dioxide for leavening the bakery product during the early stages of baking; requires substantially smaller amounts of the acid ingredient, and leaves no bitter tasting residue in the bakery product. Because of the high efficiency of the acid constituent in my baking powder the use of much greater percentages of stabilizing agents such as starch is permitted, whereby the stability of the baking powder is substantially increased. These improvements are obtained by the use of certain new highly efficient acid constituents that have not been used heretofore in baking powders. These new constituents comprise phytic acid and various salts thereof. I have found phytic acid and its calcium, sodium and aluminum salts to be particularly advantageous.

Phytic acid is a solid that is found in grains and may conveniently be isolated from waters in which corn has been steeped, for example, the steeping waters used in the wet milling of corn and isolation of corn starch. Phytic acid has a phosphate radical attached to each carbon of a hydrobenzene ring. The molecular formula for this acid is $C_6H_6(PO_4)_6H_{12}$ and its structural formula is understood to be as follows:

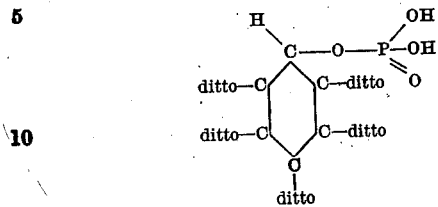

The molecular weight of this phytic acid is 660 and therefore 1 molecule of phytic acid requires 12 molecules of sodium bicarbonate to react with it in molecular proportions. The reaction may be represented as follows:

Phytic acid
$C_6H_6(PO_4)_6H_{12} + 12NaHCO_3 \longrightarrow$
$\qquad$ Sodium phytate
$\qquad C_6H_6(PO_4)_6Na_{12} + 12H_2O + 12CO_2$ Phytic acid as well as its salts, shows variable degrees of reactivity under different conditions. For example in wet dough phytic acid reacts slowly with the bicarbonate, liberating only a small amount of carbon dioxide, but it reacts rapidly and efficiently during the early stages of baking in the production of leavened bread so that the bulk of the carbon dioxide becomes available at the proper time for its intended purposes. Because of this dual characteristic of the phytic acid it alone serves the purposes of the two acid constituents usually employed, such as for example, phosphates and alums.

Because of the high molecular weight and relatively small equivalent weight of phytic acid substantially less of this acid may be used than is the practice at the present time with the usual acid constituents. As a result, it is possible when using phytic acid as the acid constituent in baking powders to increase the percentage of bicarbonate ingredient to a point where there will be an evolution of carbon dioxide far beyond the yields obtainable with the present baking powder formulas. Also, in view of the permissible reduction in amount of the acid constituent, phytic acid, the amount of starch or other stabilizing ingredient in the baking powder may be increased to a much larger percentage than has heretofore been possible.

In the common forms of baking powder now in use the bicarbonate ingredient is normally present in an amount of about 27%, the acid ingredient or ingredients are normally present in an amount of about 30% to 50% and the amount of cornstarch or other stabilizing ingredient varies in accordance with the variations in the amount of acid constituent used. For example, one of the well known baking powders which will provide the required minimum of 12% available carbon dioxide, contains approximately 27% sodium bicarbonate, 40% cornstarch and 33% calcium acid phosphate. Now, if the calcium acid phosphate is substituted by phytic acid in accordance with the present invention the 12% minimum available carbon dioxide may be produced with only 15% phytic acid instead of the 33% of calcium acid phosphate and the bicarbonate ingredient decreased and the starch increased proportionately. An example of this new baking powder may be prepared according to the following formula:

*Example I*

| | Per cent |
|---|---|
| Phytic acid | 15 |
| Sodium bicarbonate | 23 |
| Starch | 62 |
| | 100 |

It will be readily seen from the above formula that in addition to reducing the amount of acid constituent, in this case phytic acid, to a lower figure than heretofore possible, the percentage of starch or stabilizing ingredient is relatively very high, thus giving the baking powder maximum stability. The 62% starch in this example may be contrasted with the usual 25% to 45% starch that is used in baking powders designed to give the minimum 12% available carbon dioxide.

It will be apparent that the use of phytic acid as the acid ingredient in baking powders will permit the use of more sodium bicarbonate as well as starch. If the permissible increase in bicarbonate and stabilizing constituent is used entirely by the latter the stability of the new baking powder may be markedly increased over that now obtainable with baking powders using known acid constituents. The alternative addition of more acid and more bicarbonate, while restricting the amount of stabilizing ingredient to a satisfactory small amount, provides a much larger evolution of carbon dioxide from a given weight of baking powder. The following illustrative but non-limiting examples will indicate the form of baking powders that may be made when using phytic acid in accordance with my invention:

*Example II*

| | Per cent |
|---|---|
| Phytic acid | 17 |
| Sodium bicarbonate | 26 |
| Starch | 57 |
| | 100 |

The above three ingredients are mixed together in a conventional manner, and the baking powder thus produced will yield a minimum of approximately 13.6% available carbon dioxide. This represents a type of baking powder the carbon dioxide yield of which constitutes a safe small margin over the 12% minimum required by law. This baking powder it will be noticed contains 57% stabilizing ingredient, i. e. starch, which is markedly large compared with the usual 25% to 40% and therefore baking powder made in accordance with this formula would possess substantially greater stability than the usual baking powder.

If the amount of starch ingredient in the above Example II were to be reduced to the maximum amount found in present baking powder formulas, a baking powder would be produced which would have a yield of 19% available carbon dioxide and would be represented by the following formula:

*Example III*

| | Per cent |
|---|---|
| Phytic acid | 23.7 |
| Sodium bicarbonate | 36.3 |
| Starch | 40.0 |
| | 100.0 |

If it is desired to use no stabilizing ingredient in the baking powder, it may be prepared in accordance with the following formula:

Example IV

| | Per cent |
|---|---|
| Phytic acid | 39.6 |
| Sodium bicarbonate | 60.4 |
| | 100.0 |

A baking powder made according to this formula, although not very stable, would provide a yield of about 32.5% available carbon dioxide, which is greatly in excess of any maximum yield obtainable with the present baking powders with or without stabilizing ingredients.

A baking powder having sufficient stability to render it safe and stable for commercial use and which would still have a relatively large carbon dioxide yield of about 23.8%, may be prepared according to the following formula:

Example V

| | Per cent |
|---|---|
| Phytic acid | 29.7 |
| Sodium bicarbonate | 45.3 |
| Starch | 25.0 |
| | 100.0 |

Instead of the phytic acid mentioned in the foregoing examples, salts of this acid may be used. For example, the acid sodium, acid potassium, acid ammonium or other acid salts might be used as the acid constituent in these baking powders. Likewise the normal calcium, magnesium and aluminum phytates may be used as acid constituent in the baking powders. The structural formulae of two of these salts may be represented as follows:

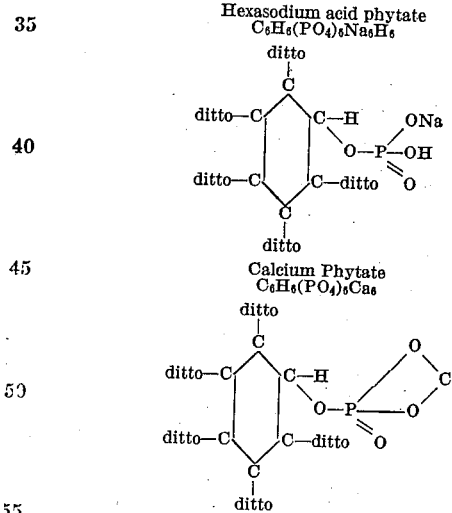

The molecular formula for normal aluminum phytate is $C_6H_6(PO_4)_6Al_4$ and for acid aluminum phytate is $C_6H_6(PO_4)_6Al_2H_6$. The structural formulas for these compounds are involved and are still somewhat in question.

The exact formula of phytic acid is still somewhat in question and the acid is frequently identified as inositol pentaphosphoric acid, which is understood to have the following structural formula:

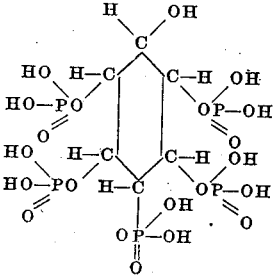

It is to be understood that when I refer to phytic acid and its salts in the specification and claims herein that I intend to cover the above inositol pentaphosphoric acid and its salts as well as the hydrobenzene hexaphosphoric acid or derivatives already indicated.

While I do not wish to limit my invention to any theoretical explanation I believe that the efficient use of phytic acid and its salts in baking powders may be explained somewhat along the following lines. Although phytic acid containing 12 acid hydrogens has a relatively high molecular weight, its equivalent weight, that is the weight required to react with a given amount of sodium bicarbonate, is very small as compared with the acid constituents now in common use. From the above structural formula of phytic acid it will be apparent that it is related to phosphoric acid, but due to its more complex structure it is slower reacting than phosphoric acid and it is a weaker acid than phosphoric acid. In the phytic acid formula, six of the acid hydrogens are much stronger than the remaining six, and the baking powder of this invention thereby shows a regulated degree of acidity or rate of action in liberating carbon dioxide, which rate is increased during baking. The chemical reactions between phytic acid and sodium bicarbonate and between hexasodium acid phytate and sodium bicarbonate may be represented as follows:

(1) $C_6H_6(PO_4)_6H_{12} + 6NaHCO_3 \rightarrow C_6H_6(PO_4)_6H_6Na_6 + 6H_2O + 6CO_2$ (2) $C_6H_6(PO_4)_6H_6Na_6 + 6NaHCO_3 \rightarrow C_6H_6(PO_4)_6Na_{12} + 6H_2O + 6CO_2$ It will be noted that the acid salts react with sodium bicarbonate in a manner similar to that of phytic acid, shown hereinabove. The normal calcium magnesium or aluminum salts however react similarly to the normal lactate salts as indicated by the following reactions:

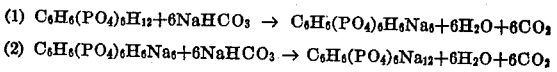

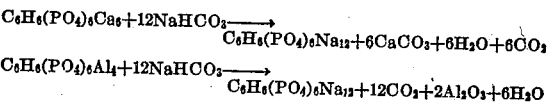

For purposes of classification and identification in the claims herein, the phytic acid and various salts thereof which may be used as the acid constituent of the baking powder in accordance with my invention, may be represented by the following formula—$C_6H_6(PO_4)_6X$. In this formula X is either hydrogens, or a non-toxic member of the group consisting of a common alkali metal, an earth metal, or ammonia, or a combination of hydrogens with any of said members of said group.

It will be understood that various modifications may be made in the materials, percentages and procedures described hereinabove by way of example, without departing from the scope of my invention. For example, cornstarch may be used advantageously as the stabilizing material but starches obtained from other grains may be used. Some of the novel features of my invention are defined in the appended claims.

I claim:

1. A baking powder containing as an acid constituent, a substance represented by the formula $C_6H_6(PO_4)_6X$ in which X is a member of the group consisting of hydrogens, sodium, potassium, ammonium, calcium, magnesium, aluminum and a combination of hydrogens with any of said other members of said group.

2. A baking powder containing as an acid constituent, phytic acid.

3. A baking powder containing phytic acid as an acid constituent and corn starch as a stabilizing constituent.

4. A baking powder comprising a mixture of phytic acid, sodium bicarbonate and starch capable of producing at least 12% of carbon dioxide when the amount of sodium bicarbonate used is at least about 27% and under such conditions permitting the starch ingredient to be present in an amount of as much as 55%.

5. A baking powder comprising approximately 15% to 40% phytic acid, 26% to 60% sodium bicarbonate and the remainder starch.

6. A baking powder containing as an acid constituent, an acid salt of phytic acid.

7. A baking powder comprising a mixture of an acid salt of phytic acid, sodium bicarbonate and starch.

8. A baking powder comprising corn starch as a stabilizing constituent and a normal salt of phytic acid as the acid constituent for effecting liberation of carbon dioxide.

9. A baking powder comprising as an acid constituent hexasodium acid phytate.

10. A baking powder comprising as an acid constituent a calcium phytate.

WILLARD L. MORGAN.